United States Patent
Domorazek (10) Patent No.: US 6,662,429 B1
(45) Date of Patent: Dec. 16, 2003

(54) DEVICE FOR MEASURING THE FILLING LEVEL IN A CONTAINER USING THERMOELEMENTS

(75) Inventor: Gottfried Domorazek, Lappersdorf (DE)

(73) Assignee: Kromberg & Schubert, Wuppertal (DE)

( * ) Notice: Subject to any disclaimer, the term of this patent is extended or adjusted under 35 U.S.C. 154(b) by 0 days.

(21) Appl. No.: 09/868,949

(22) PCT Filed: Dec. 21, 1999

(86) PCT No.: PCT/EP98/08448

§ 371 (c)(1),
(2), (4) Date: Jun. 22, 2001

(87) PCT Pub. No.: WO00/39540

PCT Pub. Date: Jul. 6, 2000

(51) Int. Cl.⁷ .............................................. H01C 17/00
(52) U.S. Cl. ......................... 29/593; 29/610.1; 29/611; 29/846; 204/192.1; 204/192.15; 204/192.17; 324/204; 73/290; 73/292; 73/295
(58) Field of Search ........................ 29/593, 601, 610.1, 29/611, 846, 831; 204/192.1, 192.15, 192.17; 427/282, 210, 404; 324/204, 207.24; 374/10, 11, 45; 73/290, 292, 295

(56) References Cited

U.S. PATENT DOCUMENTS

| | | | |
|---|---|---|---|
| 4,724,705 A | * 2/1988 | Harris | ............... 73/313 |
| 5,790,422 A | * 8/1998 | Power et al. | .............. 73/304 R |
| 5,833,748 A | * 11/1998 | Althaus et al. | ................. 117/49 |
| 6,126,792 A | * 10/2000 | Grunwald et al. | ..... 204/192.14 |
| 6,261,423 B1 | * 7/2001 | Pommer et al. | ........ 204/192.12 |

FOREIGN PATENT DOCUMENTS

| | | |
|---|---|---|
| DE | 3736208 | 5/1989 |
| DE | 4030401 | 9/1991 |
| DE | 4434646 | 4/1996 |

* cited by examiner

Primary Examiner—A. Dexter Tugbang
Assistant Examiner—Tai Nguyen
(74) Attorney, Agent, or Firm—Friedrich Kueffner (57) ABSTRACT

In a device for measuring the filling level, thermoelements (20) are used which are disposed on a sheet-shaped support (25). The thermoelements (20) consist of two different materials and are disposed in two rows (71, 72) placed side by side. Two adjacent thermoelements (20) of said rows (71, 72) have a common junction point (23) that is heated. Both rows (71, 72) of thermoelements also have two additional junction points that are cold. A first group of thermoelements (20) is disposed with their supports (25) in the interior of the container and operate as measuring detectors. A second group of thermoelements (20) serves as reference sensors since they regulate the heat flow impinging upon the junctions points (23) relative to a defined reference voltage.

13 Claims, 8 Drawing Sheets

DEVICE FOR MEASURING THE FILLING LEVEL IN A CONTAINER USING THERMOELEMENTS

BACKGROUND OF THE INVENTION

A method for manufacturing a device where a set of thermoelements, comprised of two junction points between two different materials, are connected in series and function as measuring sensors. The measurement is based on the physical effect that the thermoelectric voltage of a thermoelement changes as a function of which materials, such as gas or liquid, the junction points come into thermal contact with. One junction point in the thermoelements is heated by an electric heat conductor with heating current being controlled when doing so. Therefore, this junction point is referred to as "hot junction point". The other junction point is not heated and is therefore referred to as "cold junction point".

In a known method (DE 40 30 401 B1) metals or semiconductors are vapor-deposited first onto foils and out of these stamped parts are cut which, by means of adhesives at the backside, are placed onto a sheet-shaped support. Subsequently, by screen printing narrow metallic conductive cement strips are applied so that thermoelements result. For a space-saving configuration L-shaped stamped parts are cut out of the foil strips and these are glued in mirror-symmetrical arrangement and with height staggering in two rows onto a support and then the ends of L-shaped legs are printed with a metallic conductive cement with lines such that serially connected thermoelements result. The manufacture of this known device is expensive and has a high failure liability. The manufacture of the stamped parts and their arrangement on the common support are cumbersome and errors are hardly avoidable. During stamping a relatively high amount of waste results which prevents an economic manufacture of the device. Alloys, such as nickel-chromium or constantan, important for the thermoelectric voltage, cannot be deposited onto the foil strip because they decompose during this process.

In another method (DE 4 34 646 A1) a stamped part in the form of a strip has also been cut out of a plastic foil which is then coated with a semi-conductor material by means of chemical, physical, or mechanical methods. On this strip a metallic conductive application layer was applied by screen printing at certain locations. This was supposed to result in large surface area connections of the thus resulting thermoelements. The thermoelements are series-connected. Onto the backside of the support a heating conductor in meander shape was printed by means of a metallic conductive cement. Because the heating current changes by a change of the surrounding temperature in the same direction, a reference sensor has been positioned on the heating conductor which controls the heating current by means of a compensation circuit. In this case, it was also not possible to use interesting alloys such as nickel-chromium or constantan neither during manufacture of the strips nor for printing of the strips.

SUMMARY OF THE INVENTION

It is an object of the invention to develop a method for a reliable manufacture of a space-saving device with high measuring precision for measuring the filling level in a container or for measuring gas by means of thermoelements. This is achieved according to the invention by the features to be explained in the following.

The invention has firstly recognized that the very interesting alloys for configuring thermoelements, chrome-nickel, on the one hand, and constantan, on the other hand, can be applied by sputtering onto a support. When sputtering, a high-energy plasma is directed onto a target where metals are impacted and are applied onto the desired carrier by means of a magnetic field. The invention uses in this connection masks where the shape of the resulting fields for the alloy for forming the thermoelements are very precisely formed by cutouts. The different masks are placed successively in a defined position so that during sputtering the different L-shaped and I-shaped fields in both rows have an extremely precise position relative to one another. On the backside of the support successively a fourth and fifth mask, either provided with a narrow or a wide slot, are provided for applying by sputtering of the desired materials, in particular, silver, a common heating conductor and its return line. The heating conductor can then be positioned precisely in the longitudinal center of the junction points between the two double rows provided on the front side of the carrier and in this way generates the common hot junction point.

In a similar way, at least one reference sensor is manufactured on a sheet-shaped support, respectively, an entire set of reference sensors. One can correct the undesirable temperature effect on the heating conductor also in other ways.

The invention also relates to a device produced according to the method according to the invention wherein the set of measuring sensors has correlated therewith a group of reference sensors.

In the known device (DE 44 34 646 A1) it was considered necessary to position the reference sensors independent of the measuring sensors in order for them not to come into contact with the liquid. If this was not done, their control effect would not have been possible. Therefore, in the known devices the reference sensor(s) have always been arranged external to the container whose filling level was to be measured. This not only requires a corresponding space expenditure but also entails circuit problems when connecting the measuring sensors and their heating conductor. The independent arrangement of the reference sensor(s) requires corresponding measures for their protection. This requires additional components which increase the space requirement. The separate attachment of the reference sensors increases also their failure liability. The manufacture and assembly of the known reference sensors and their protection are cumbersome and cost-intensive.

This is however also solved by the invention by the following measures according to which the reference sensors together with the measuring sensors are arranged in the container interior. Their interconnection is particularly simple. The container itself provides the protective function for the reference sensors arranged in its interior. The control effect of the reference sensors remains thus in effect because its junction points are brought into contact with a body having a constant thermal conductivity. This can be achieved in the form of a thermal insulation which protects the junction points of the reference sensors relative to the liquid. Such a body of constant thermal conductivity could also be a plastic body. The measuring sensors and reference sensors are insulated relative to the corresponding electric heat conductors.

Another possibility resides in that the reference sensors are arranged at the bottom of the container where there is always residual liquid present which ensures the constant thermal conductivity between the hot and cold junction points. Finally, it would also be conceivable to use for this purpose the upper area of the container where even for a full filling level no liquid will reach. In the latter case, the gas which is always present thereat provides the constant thermal conductivity. In these two last mentioned alternatives, corresponding bulges in the interior of the container are available for receiving the reference sensors in the container interior.

The simplest possibility for realizing the invention is however the aforementioned use of thermal insulation in the area of the reference sensors for which purpose different possibilities are provided. Some of them are mentioned in the dependent claims.

BRIEF DESCRIPTION OF THE DRAWINGS

Further measures and advantages of the invention result from the dependent claims, the following description, and the drawings. In the drawings, the invention is schematically illustrated in several embodiments. It is shown in:

DESCRIPTION OF PREFERRED EMBODIMENTS

Figure 1:
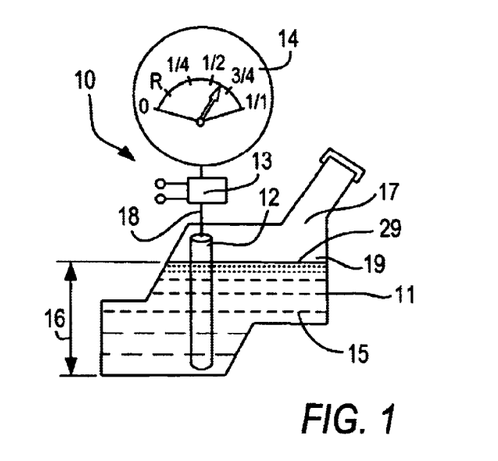
FIG. 1 schematically an application situation of the inventive device in a fuel tank of the vehicle.

As illustrated in FIG. 1, the device 10 according to the invention can serve for determining the respective filling level of a container 11. It is comprised in the present case of a fuel tank 11 of the vehicle. Such a fuel tank has a complex spatial shape for the reason of optimal use of the available space in the vehicle. The device according to FIGS. 1 through 3 comprises in the container interior 19 a combined measuring device identified by 12 that is connected by connecting and control lines 18 with an electrical evaluation device 13 and a display 14, for example, in the form of a display device. In the interior of the container a liquid 15 is present, for example, fuel, wherein as a function of the liquid consumption, a changing filling level 16 results. Above the liquid level 12 a gas 17 is present, for example, air, together with the vapors of the liquid 15. The filling level 16 is determined by the electrical circuit illustrated in FIG. 3 wherein the measuring device 12 follows the general construction principle illustrated in FIG. 2.

Instead of the combined measuring device 12 according to FIGS. 1 through 3, it is also possible to arrange a measuring device part 66 for measuring sensors according to FIG. 4 and 10 in this way which has correlated therewith an analog measuring device part, which will be explained in more detail in the following, for reference sensors with analog construction. This other measuring device part, in contrast to the first embodiment of FIGS. 1 through 3, can then also be arranged external to the tank inasmuch as it is ensured that the temperature difference between the measuring medium and the other measuring device part is limited and, for example, does not surpass ±20° C. In the measuring device 12 as well as in the measuring device part 66 a plurality of thermoelements 20 are used whose configuration will be explained with the aid of FIG. 4.

Figure 4:
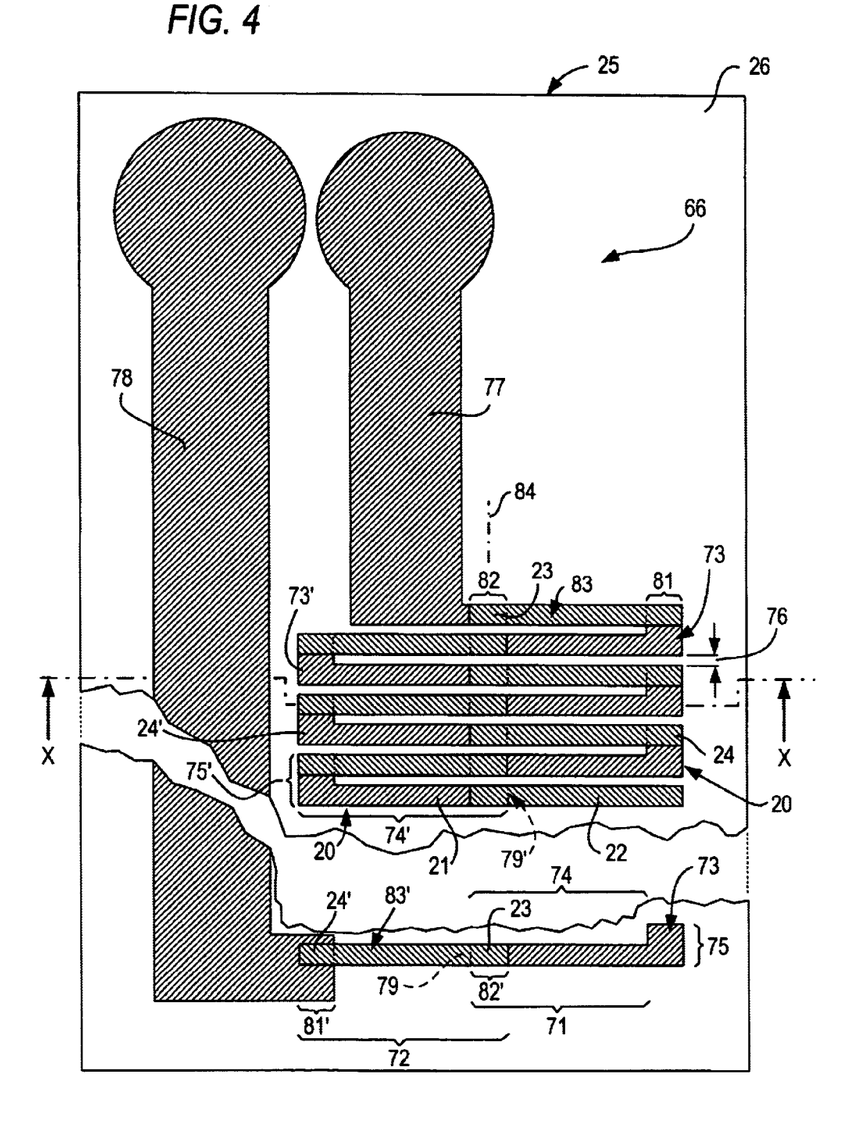
FIG. 4 on a greatly enlarged scale the plan view onto the thermoelements of the measuring sensor of a second embodiment of the device according to the invention where the reference sensors are positioned on a separate support.
Figure 5:
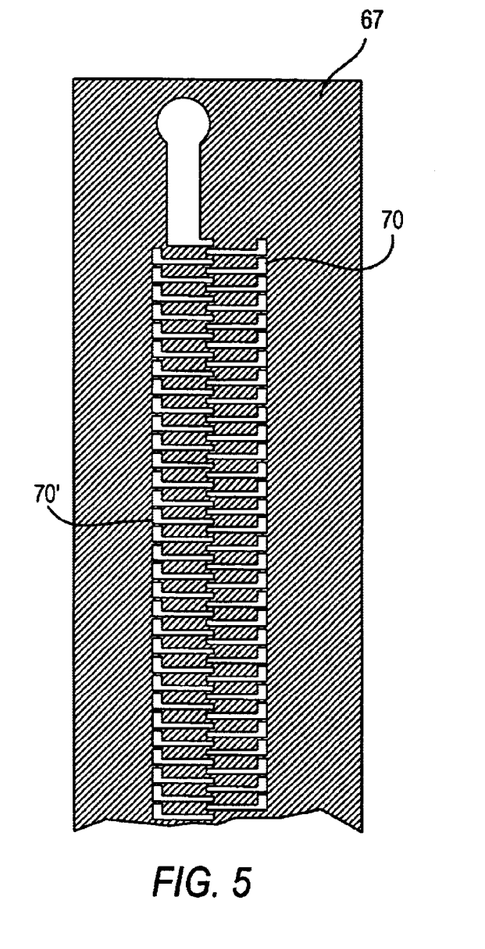
FIGS. 5 and 6 in approximately natural size the upper partial piece and the two end pieces of two masks with which the first material for manufacturing the thermoelements of the measuring sensors illustrated in FIG. 4 are applied on the front side of a foil-shaped support which is not illustrated in detail.
Figure 6:
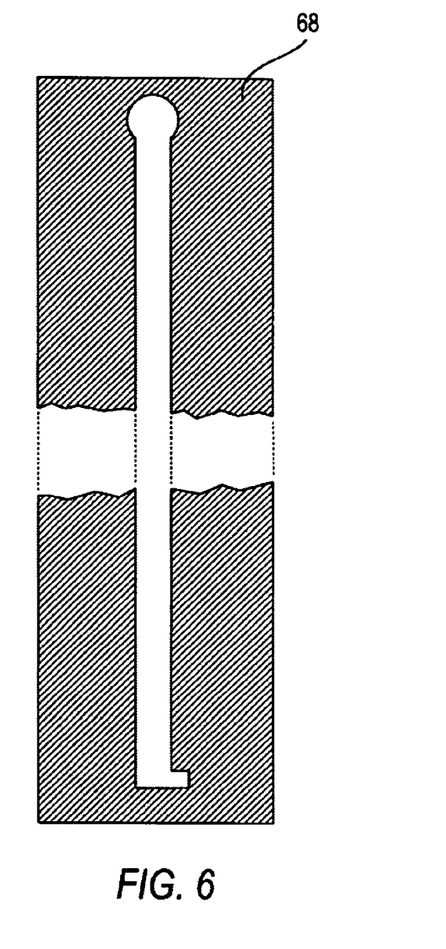
Figure 7:
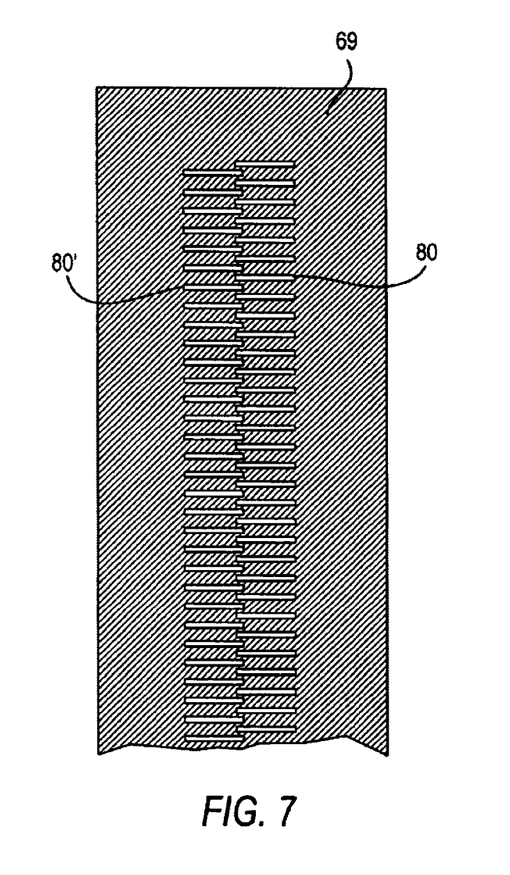
FIG. 7 a corresponding partial piece of a third mask which serves for sputtering the other material for the thermoelements onto the measuring head of FIG. 4.

The thermoelements 20, as can be seen in FIG. 4, can be arranged in two rows 71, 72 and are comprised of two different materials 21, 22 which however match one another within the rows 71, 72. In the present case, one material 21 can be a nickel-chrome alloy while the other material 22 is, for example, constantan. These materials 21, 22 are applied onto the front side 26 of a sheet-shaped support 25 which is advantageously embodied as a foil. The material of the foil may be a polyamide or polyether ether ketone (PEK). The materials 21, 22 are applied by sputtering which has been found to be especially suitable for the selected special configuration. For this purpose, the masks which are shown in FIGS. 5 through 7 are used. The first mask 67 of FIG. 5 serves for applying the first material 21. It contains two rows of L-shaped cutouts 70, 70' which after sputtering generate two mirror-symmetrically arranged L-shaped fields 73, 73' of the material 21 on the support foil 25. These fields 73, 73' are facing one another with their long L-legs 74, 74' but are spaced apart from one another by a spacing 76 which is sufficient for insulation purposes. Accordingly, the two correlated short L-legs 75, 75' are positioned respectively in the two outer border areas of the thermoelement rows 71, 72. The mask 67 has, of course, also a cutout for the first terminal tab 77 to be formed of the two future thermoelement rows 71, 72. The two end faces 79, 79' of the long L-legs 74, 74' are laterally displaced relative to one another by a certain amount in the two rows 71, 72.

The aforementioned first material 21 is supplied by a second mask 68 according to FIG. 6 also onto the front side 26 of the support foil 25 and generates after sputtering the second terminal tab 78 shown in FIG. 4. Only thereafter the third mask 69 illustrated in FIG. 7 is used which has two rows of I-shaped cutouts 80, 80'. These then generate the I-shaped fields 83, 83', illustrated in FIG. 4, in the two rows 71, 72. The two I-shaped fields 83, 83' are exactly aligned with respect to the length as well as with respect to their width and position with the aforementioned L-shaped fields 73, 73'.

The two inwardly oriented end area is 82, 82' of the I-shaped fields 83, 83' overlap with the long legs 74, 74' of the respective L-shaped fields 73, 73' located in the respectively oppositely positioned rows 72, 71. These overlaps are positioned, for example, on the line 84 indicated in a dash-dotted line in FIG. 4, approximately in the longitudinal center between the two thermoelement rows 71, 72 to be formed. The two outwardly oriented end areas 81, 81' of the two I-shaped fields 83, 83', in turn, overlap with the ends of the two short L-shaped legs 75, 75' of the respective neighboring L-shaped fields 73', 73. These outer overlaps of 81, 75 or 81', 75' are located in the edge areas of the two rows 71, 72.

Figure 10:
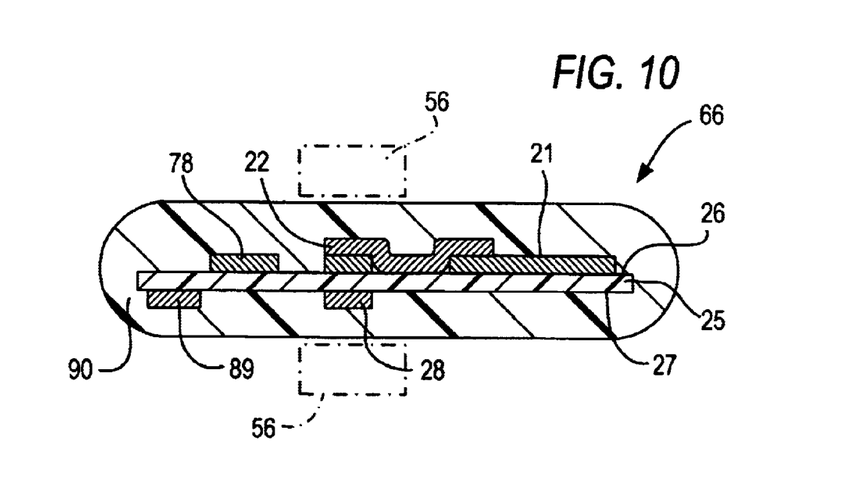
FIG. 10 a cross-section of the finished support receiving only the measuring heads according to FIG. 4 before being mounted in a fuel tank of a vehicle.

FIG. 10 shows a cross-section of a finished measuring device part 66 from which the further process for mounting can be taken. As can be seen therein, on the backside 27 of the foil 25 a heat conductor 28 is applied which extends approximately in the longitudinal center of the foil 25 and aligned with the line 84 shown in FIG. 4. Accordingly, the overlaps of 79, 82' and 79', 82 taking place in the longitudinal center between the two rows 71, 72 provide the necessary decisive hot junction point 23 for the thermoelements 20. Accordingly, the two outer overlaps 81, 75 and 81', 75' are the corresponding cold junction points 24, 24' in the oppositely positioned border areas of the double rows 71, 72.

Figure 8:
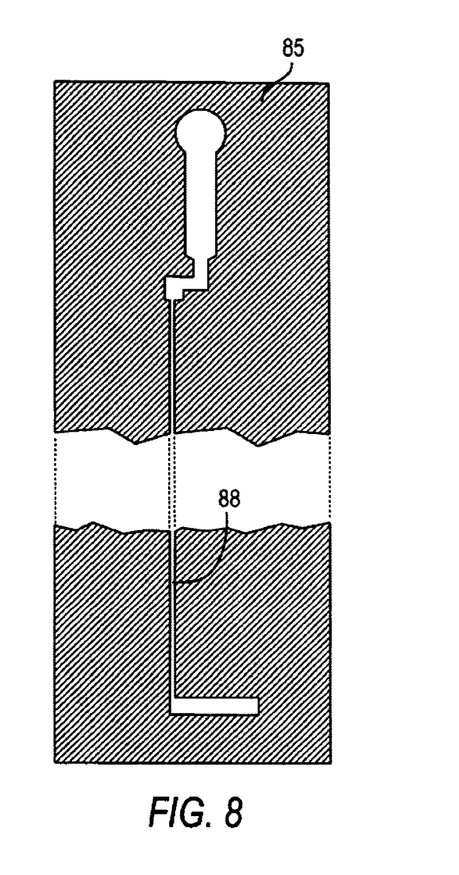
FIGS. 8 and 9 the corresponding masks for sputtering a material forming the heat conductor for current supply and for serving to heat the heat conductor of the hot junction points in the thermoelements of the measuring head of FIG. 4.
Figure 9:
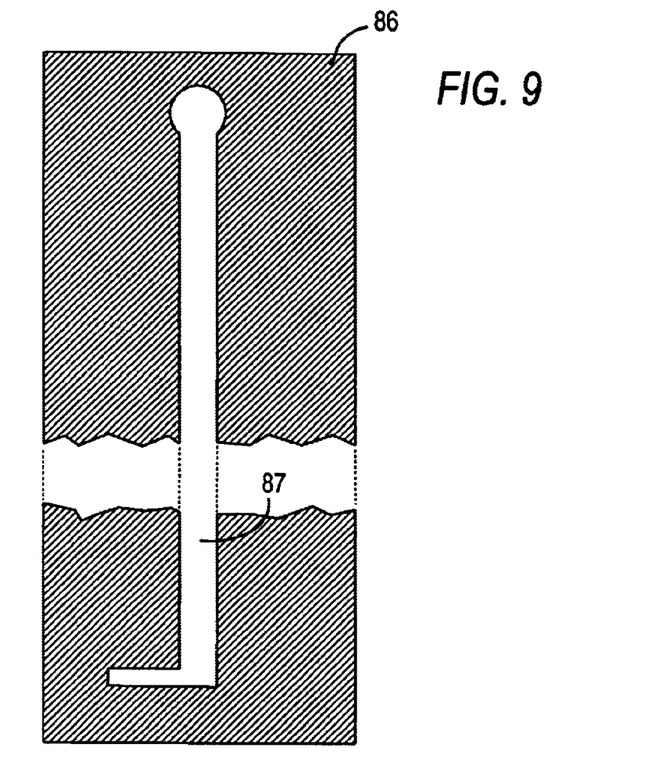

The heat conductor 28 can be applied by the sputtering method onto the foil backside 27 for which purpose the masks 85, 86 shown in FIGS. 8 and 9 are used. The material for the heat conductor is advantageously silver. For the actual heat conductor 28 the mask 85 has a narrow slot 88 whose size corresponds to the strength of the heating current and the desired temperature increase of the hot junction point 23. At the end of the slot 88, widened terminal areas are provided whose incidental heating is undesirable. For completion of the heating circuit the second mask 86 for application of a neighboring silver conductor is used for which purpose a widened slot 87 with junction point at the ends is provided. Accordingly, the current return 89 for the heat conductor 28 is generated, which is illustrated in FIG. 10 and which in the operating situation is not to be heated by the heating current.

The thus produced pre-product is then coated on all sides with the plasma polymer layer 90, according to FIG. 10. This layer 90 is also applied by means of the sputtering method. It forms an excellent barrier layer relative to diffusion of foreign atoms into the foil. Modified silicone-hydrocarbon layers are suitable as plasma polymers.

As has been mentioned above, FIGS. 2 and 3 show an embodiment modified relative to the measuring device part 66 of FIGS. 4 and 10 where the thermoelements 20 are divided into two branches 34, 44 having different functions relative to one another which in the following generate two measuring sensors 43 and reference sensors 33 combined in a common measuring device 12. In FIGS. 2 and 3 the thermoelements 20 are illustrated conventionally; however, expediently, the same thermoelement configuration as that of the double rows 71, 72 illustrated in FIG. 4 will be used. The measuring sensors 34 as well as the reference sensors 33 are heated at their hot junction points 23 by a suitable extension of the same electrical heating conductor 28. Not only the configuration and the number of the two sensors 33, 43 are identical but, expediently, also its arrangement pattern 34, 44 shown in FIG. 3 on the, preferably common, support foil 25.

Figure 2:
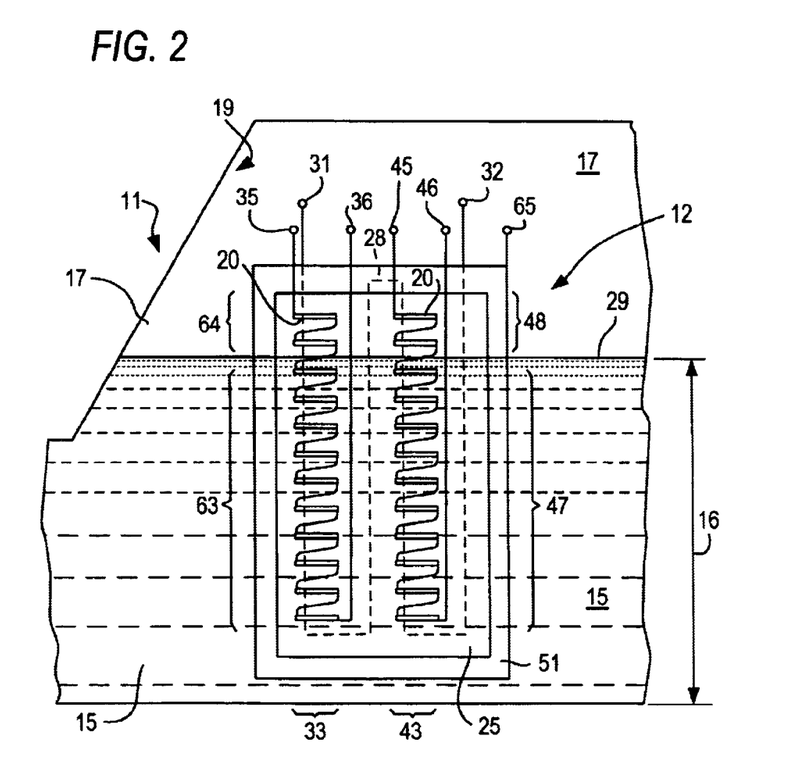
FIG. 2 schematically the construction principal of the measuring device, arranged in the fuel tank, of the first embodiment of the device according to the invention where the components of a measuring and control device are arranged on the same support.

The measuring sensors 34, 44, as illustrated in FIG. 2, are arranged at different but defined levels in the container interior 19 as required for the desired measuring-technologically determination of the filling level 16. This configuration also is mirrored in the arrangement of the reference sensors 33, even though the thermoelements 20 in the reference branch 44 are not to respond to differences of the filling level of the tank, which will be explained in more detail in the following. This symmetrical configuration of the sensors 33, 43 on both sides makes possible, as a result of their pattern identity, an especially simple and quick manufacture of both branches 34, 44.

Figure 12:
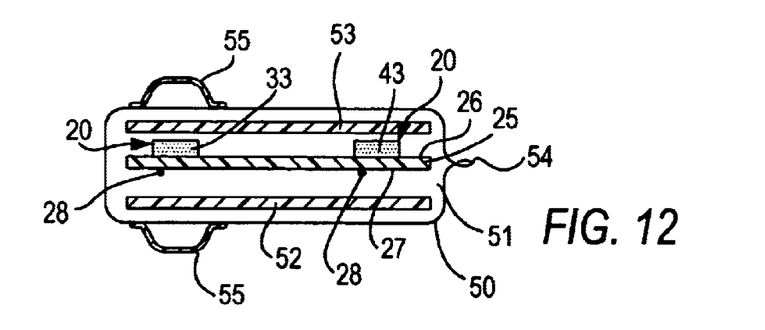
FIG. 12 schematically, in analogy to FIG. 10, a cross-section of the envelope illustrated in FIG. 11 along the section line XII—XII which illustrates the interior configuration.

Even though it is possible to then also apply the aforementioned plasma polymer layer 90, explained in connection with FIG. 10, onto the combined measuring device 12 as a protection, FIG. 12 shows an alternative which relates back to the embodiment of FIGS. 2 and 3. Here, an envelope 50 is provided which also prevents a direct contact of the sensors 33, 34 with the respective possibly aggressive media. In order to prevent reliably diffusion of liquid molecules into the interior 51 of the envelope, the envelope is comprised of a very thin metal foil 50 which, however, basically remains thermally transparent, particularly in the area of the measuring sensors 43. For this reason, the metal foil 50 has a minimal thickness of, for example, the 3 to 8 $\mu$m. Accordingly, the respective measuring sensors 43 with their cold junction points 24 can feel the different thermal conductivity of the liquid 15 and the gas 17. The metal foil 50 acts also as a vapor lock and is soldered at the seam 54 illustrated in FIG. 12. The metal foil 50, as illustrated in FIG. 3 by reference numeral 65, is connected to ground potential and serves additionally for shielding electromagnetic fields. Between the metal foil 50 and the support foil 25, supporting the diverse thermoelements 20 and lines, covering foils 52, 53 are provided which serve for electrically isolating the metallic foil 25 relative to the thermoelements 20. The metal foil 50 is comprised preferably of copper or copper alloys, such as CuZn or CuNi (constantan).

In the present case, the thermoelements 20 of the entire set of measuring sensors 43 in the branch 44 as well as the entire set of the reference sensors 33 in the branch 34 are switched in series, respectively. The corresponding two terminals 45, 46 or 35, 36, according to FIG. 2, are guided out of the enclosing metal foil 50, taking into account electrical isolation, wherein, according to the circuit shown in FIG. 3, one terminal 35, 45 can be connected to ground potential, respectively. It is also possible to employ a different circuit. Instead of the serial connection, it is also possible to employ a parallel connection of the respective thermoelements 20 in order to perform an evaluation of the thermoelectric current because in this case the thermoelectric voltage would be constant.

The hot junction points 23 of the measuring sensors 43 which are maintained by the electrical heating line 28 at higher temperatures, as well as the cold junction points 24 are in thermal contact with the respective environment external to the envelope 50. As a result of the already mentioned different thermal conductivities of the two media 15, 17, the junction points 23, 24 reach a different temperature level corresponding to the respective different height level of the liquid level 29. The subset 47 of the measuring sensors 43 shown in FIG. 2, which is located at the level of the liquid 15, reaches as a result of the good thermal conductivity in this area a lower temperature than that of the residual set 48 above the liquid level 29 because the medium 17 that is present therein and is a gas dissipates the generated heat badly. When different filling levels 16 are present, this results in a different measured voltage at the terminal 46 of FIG. 3 which is determined in the following measuring circuit 40 of the evaluation device 13.

In the measuring circuit, a reference voltage source 41 is provided relative to the ground potential which acts onto the input of an operational amplifier 42. The measured voltage $U_{meas}$ at 46 is supplied via an impedance converter 49 to the other output operational amplifier 42 and provides an output signal at the output line 60. The output signal can then be guided via an analog digital converter to an evaluation circuit which controls, for example, a digital filling level indicator. Another possibility resides in that the output signal 60 is supplied via a voltage current converter to an analog display 14 according to FIG. 1. The output signal 60 depends on the filling level 16 which can be read by the aforementioned circuit means in the display or the analog indicator 14. With a suitable threshold switch the output signal can also be used for controlling a suitable reserve display for the filling level 16.

The invention ensures that the reference sensors 33 are not affected by the different measuring level 16 between the two media 15, 17, but that instead, despite their parallel position relative to the measuring sensors in the container interior 19, they always have the same thermal conductivity at their junction points 23, 24. For this purpose, generally speaking, a thermal insulation is employed which expediently covers the entire branch 34 of the reference sensors 33. This is explained in connection with FIGS. 11 to 16 in different embodiments.

Figure 11:
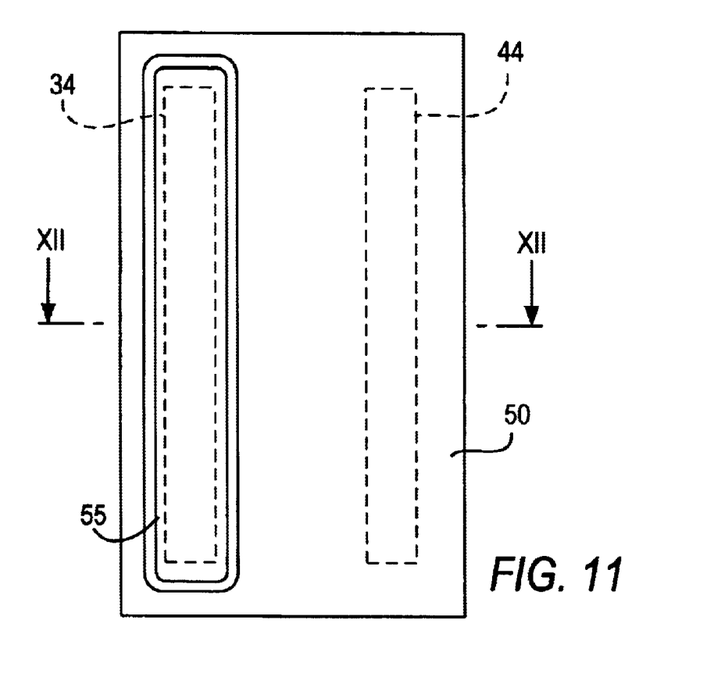
FIG. 11 the schematic plan view onto an envelope receiving the measuring device of FIG. 3.

In FIGS. 11 and 12 the insulation is in the form of a continuous airbag 55 which is seated on the outer side of the metal foil 50. It covers the entire field, indicated in FIG. 11 by dash-dotted lines, with the branch 34 of the reference sensors 33. The field which is illustrated analogously in FIG. 11 with the branch 44 of the measuring sensors 43 is, of course, free thereof.

Figure 13:
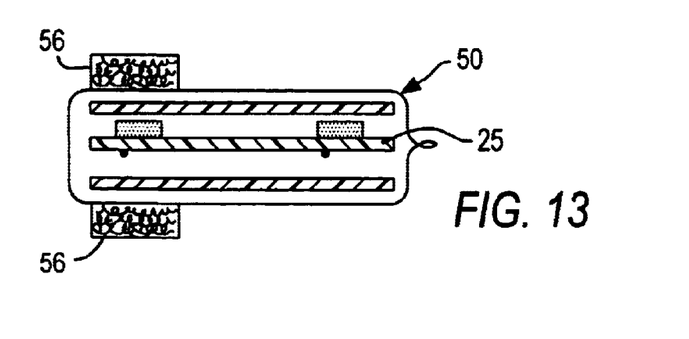
FIG. 13 in an illustration corresponding to FIG. 12 an alternative embodiment of the device of FIG. 3 according to the invention FIG. 14 in a plan view corresponding to FIG. 11 a partial piece of an alternatively embodied envelope of the device of FIG. 3 according to the invention.

In the schematic of FIG. 13 the thermal insulation is in the form of a foam layer 56 which in this case is also applied on the outer side of the metal foil 50. In the alternative illustrated in FIG. 16, the two cover foils 52, 53 are used as supports for the foamed material layer 56 on both sides. Accordingly, the foamed material 56 is thus positioned in the interior 51 of the envelope 50.

Figure 14:
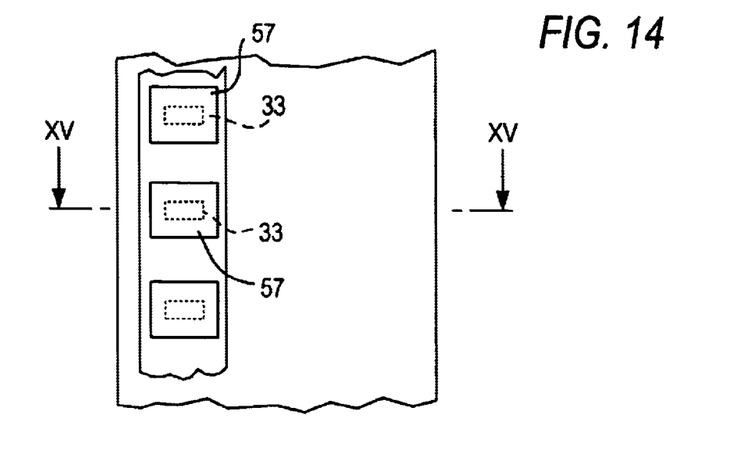
Figure 15:
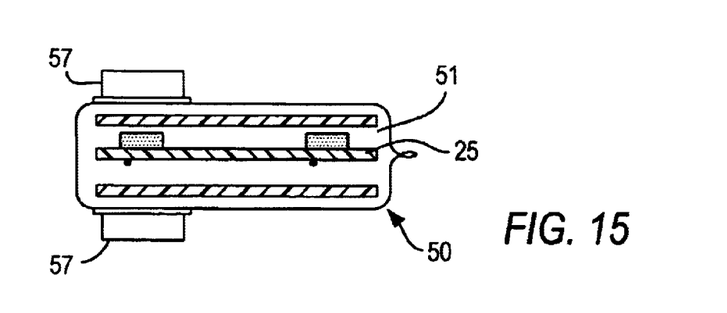
FIG. 15 in an illustration corresponding to FIG. 12 a cross-section of the device illustrated in FIG. 14 along the section line XV—XV indicated therein.
Figure 16:
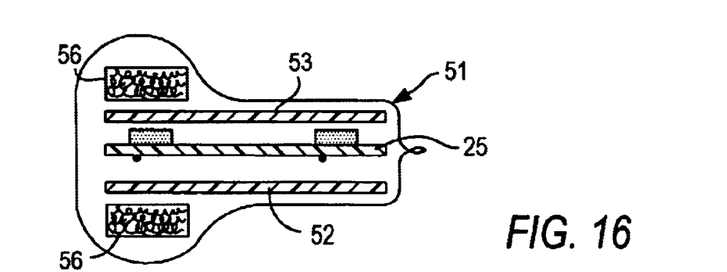
FIG. 16 again a cross-section, in analogy to FIG. 15, of a further modified embodiment according to the invention.

In the last embodiment of FIGS. 14 and 15, air chambers 57 are used for thermal insulation which can be correlated individually to the reference sensors 33. These air chambers 57 in this case are also on the outer side of the metal foil 50. The air chambers 57 can also be arranged at the inner side of the metal foil 50. Further alternatives could reside also in that such thermal insulation means are, for example, integrated directly in the cover foils 52, 53 in that it is formed at the locations or zones of the reference sensors 33 of an especially great thickness.

Figure 3:
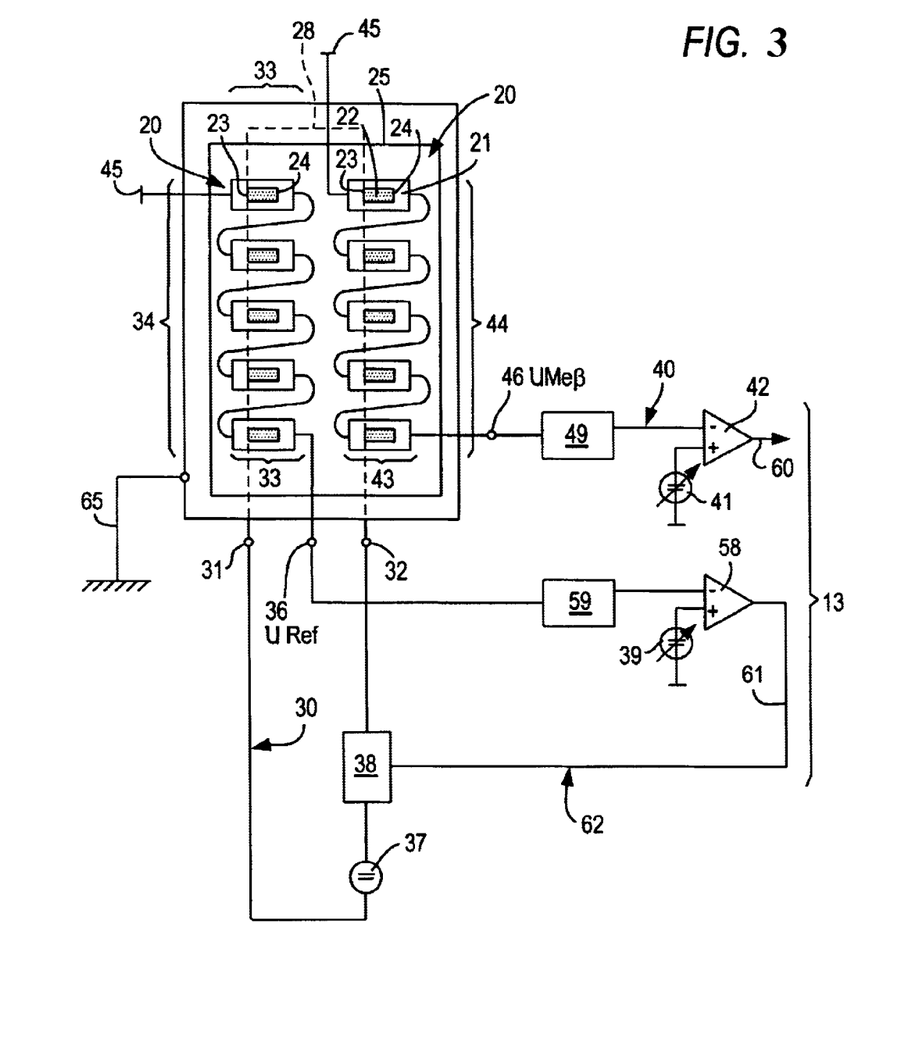
FIG. 3 a circuit diagram of a first embodiment of the device illustrated in FIG. 2.

As illustrated in FIG. 3, the reference sensors 33 are provided for controlling the heat current flowing within the heating circuit 30 which is supplied from a voltage source 37 within the heating circuit 30. The branch 34 provides the "sensing member" of the control circuit 62 whose control member 38 is arranged in the heating circuit 30 and serves for adjusting the heating current. The thermoelectric reference voltage $U_{ref}$ present at the terminal 36 is connected via impedance converter 59 to the input of an operational amplifier 58 whose other input is connected to an adjustable, but fixed reference voltage source 39. The output signal at the output line 61 of the operational amplifier 58 controls the control member 38 in the heating circuit 30. When as a result of temperature effects or aging effects the electrical resistance of the heating conductor 28 is changed or as a result of fluctuations of the supply voltage, the heating current is corrected by the control circuit 62.

This symmetrical configuration of the measuring and reference sensors 43, 33 results in new surprising effects. When the container 11 is empty, the measured voltage $U_{meas}$ at 46 in FIG. 3 will always be identical to the reference voltage at 36. As a result of manufacturing tolerances, the individual thermoelements 20 can have different thermoelectric voltages for the same temperature. For a sufficiently large number of thermoelements 20 in the two branches 34, 44, the different thermoelectric voltages will compensate one another. Measuring errors can result as a function of the surrounding temperature but they are completely compensated by the device according to the invention for the following reason.

Even when the temperature difference $\Delta T$ between the cold and the hot junction points 24, 23 remains constant, an increase of the surrounding temperature results in an increase of the thermoelectric voltage in the thermoelements 20. For an increase of the surrounding temperature the thermoelectric voltage of the individual elements 20 increases in the reference branch 34 and in the measuring branch 44 by the same amount. Due to the control circuit, the heating current in the heating circuit 30 is controlled so long until the reference voltage $U_{ref}$ at 36 will have the original value. Thus, the heating current in the heating circuit 30 drops and, moreover, the measured voltage $U_{meas}$ will drop to the original value. This control functions even when, for example, only one thermoelement 20 in the two branches 34, 44 is exposed to a higher surrounding temperature.

When using the device 10 in a fuel tank 11, great temperature differences between the liquid 15 and the gas 17 arranged above can occur, for example, when filling in that heat of the summer where cold fuel 15 is filled into the hot tank 11. It can be determined by theoretical calculations of the full and the empty tank 11 as well as experimentally that the obtained measured voltage $U_{meas}$ in the measuring branch 44 is independent of the surrounding temperature when the reference branch 34 which serves for controlling the heating current in the heating circuit 30 has the same configuration as the measuring circuit 44. The temperature effects occurring in both branches 34, 44 do not cause a measuring error. This also holds true for any desired filling level 16 in the container 11. Even when horizontal temperature layers are present within the container 11, the resulting measuring errors in the two branches 34, 44 are compensated.

When the support foils 25 provided with the thermoelements 20 are mounted vertically in the tank 11, the vertical electrical field component of an impinging electromagnetic wave results in a voltage induction in the longitudinal direction of the foil. Such a potential will occur however in the measuring branch 44 as well as in the reference branch 43 and, accordingly, will overlay the wanted signals $U_{meas}$ and $U_{therm}$. Low-frequency noise fields effect low-frequency noise voltages which can be filtered only with difficulty. Since however in the device 10 according to the invention the direction and the amount of the induced voltages in both branches 44, 34 is identical, respectively, these effects are also basically canceled out. The device according to the invention accordingly has as a result of its symmetrical configuration a high stability with respect to its electromagnetic compatibility (EMV).

The symmetrical configuration of the two branches 44, 34 with separate electronic device has the advantage that, as a result of the large number of thermoelements 20, the reference voltage $U_{ref}$ is so large that it can be transmitted without noise. By means of symmetrically twisted electrical lines for the reference voltage $U_{ref}$ and the measured voltage $U_{meas}$, the noise voltages can be minimized. With regard to high-frequency considerations, both lines are provided with identical loads and behave identically in the case of noise fields with respect to the induction of noise voltages. The induced noise voltages are identical with respect to their amount and phase and thus effect no display errors in the display 14.

As has been mentioned before, in FIGS. 4 and 10 only one measuring device part 66 is shown which in connection with the last described embodiment 12 comprises measuring sensors identified by 43. This measuring device part 66 is thus within the container interior 19 of FIG. 1. A corresponding further measuring device part which comprises at least one single reference sensor is provided on a separate support, for example, a further foil. This further support can then be arranged also externally to the container interior 19 and is thus never in contact with the liquid medium 15 of FIG. 1. More beneficial is also in this connection a plurality of thermoelements as reference sensors 33 which then should have expediently the configuration illustrated in FIG. 4. When these reference sensors 33 of the other measuring device part also are immersed in the liquid entirely or partially, then the thermal insulation 56 already described will also be used here. With respect to the configuration of FIG. 10, thermal insulation would be provided at locations identified therein with 56 and illustrated in dash-dotted lines.

The aforementioned chain arrangement of the thermoelements could also be used for gas quantity measurements. A preferred application in this context is the air quantity measurement for injection engines. For a certain engine output an internal combustion engine requires a certain mixture of air (oxygen) and fuel. For determining the intake air quantity in the injection motors an air quantity measuring device is used.

In conventional systems, inter alia, a mechanically operating air quantity measuring device is used. In this connection, the intake air stream moves a throttle flap against the restoring force of a spring. A potentiometer converts the angular position of the vacuum flap into a corresponding voltage value.

The same object can also be taken on by a thermoelement chain which is positioned in the intake pipe because cooling of the warm junction points of the heated thermoelements acts proportionally to the air flow. The stronger the flow of air, the more reduced is the thermoelectric voltage sum. Effects of the temperature of the intake air, supply voltage fluctuations, and aging effects can be completely compensated by a control of the heating current by means of thermally insulated reference thermoelements positioned in the air flow.

List of Reference Numerals 10 device
11 container, fuel tank
12 combined measuring device
13 evaluation device
14 display, analog display
15 liquid, first medium in 19
16 filling level in 19
17 gas, second medium in 19
18 connecting and control line
19 container interior of 11
20 thermoelement
21 first material of 20=CiNi
22 second material=constantan
23 hot junction point between 21, 22
24, 24' cold junction point between 21, 22
25 sheet-shaped support, support foil
26 front side of 25
27 backside of 25
28 electrical heat conduction, heat conductor
29 liquid level between 15, 17
30 heating circuit for 28
31 first terminal of 28
32 second terminal of 28
33 set of reference sensors
34 reference branch, field of 33
35 first terminal of 34
36 second terminal of 34
37 voltage source
38 control member of 62
39 reference voltage source in 62
40 measuring circuit
41 reference voltage source in 40
42 operational amplifier in 40
43 set of measuring sensors
44 measuring branch, field of 43
45 first terminal of 44
46 second terminal of 44
47 partial set of 43 in 15
48 residual set of 43 in 17
49 impedance converter
50 envelope, metal foil
51 envelope interior
52 first cover foil in 51
53 second cover foil in 51
54 sealed seam of 50, soldering seam
55 thermal insulation, airbag (FIGS. 4, 5)
56 thermal insulation, foamed layer (FIGS. 10, 13, 16)
57 thermal insulation, air chamber (FIGS. 14, 15)
58 operational amplifier in 62
59 impedance converter in 62
60 output signal line in 40
61 output signal line in 62
62 control circuit
63 partial group of 33
64 remaining group of 33
65 ground potential for 50
66 measuring device part (FIG. 4)
67 first mask for 21 of 20 (FIG. 5)
68 second mask for 21 of 20 (FIG. 6)
69 third mask for 22 of 20 (FIG. 7)
70, 70' L-shaped cutout in 67
71 first row of 20 (double row)
72 second row of 20 (double row)
73, 73' L-shaped fields of 21 in 67 (FIG. 5)
74, 74' long leg of 73, 73'
75, 75' short leg of 73, 73'
76 spacing between 74, 74'
77 first terminal tab of 21 on 25
78 second terminal tab of 21 on 25

79, 79' end piece of 74, 74'
80, 80' I-shaped cutouts in 69 (FIG. 7)
81, 81' outer end area of 83, 83'
82, 82' inner end area of 83, 83'
83, 83' I-shaped fields of 22
84 line, longitudinal center between 71, 72
85 first mask for 28 (FIG. 8)
86 second mask for 28 (FIG. 9)
87 wide slot in 86 (FIG. 9)
88 narrow slot in 85 for 28 (FIG. 8)
89 current return
90 plasma polymer layer (FIG. 10)

What is claimed is:

1. Method for manufacturing a device (10), wherein the device serves for electronically measuring a filling level (16) of a liquid (15) in a container (11) or for gas quantity measurement, wherein the device is comprised of a set of thermoelements (20) which are arranged on a single sheet-shaped support (25) and connected in series and function as measuring sensors (43), wherein the method comprises the steps of:

applying a first mask (67) onto a front side (26) of the sheet-shaped support (25), wherein the first mask (67) has in a double row (71, 72) two mirror-symmetrically arranged L-shaped cutouts (70, 70') having long legs and short legs, respectively, and wherein the two L-shaped cutouts (70, 70') in the double row (71, 72) are height-displaced with regard to the long legs (74, 74') relative to one another and wherein leg ends (79, 79') of the long legs face one another, applying either a nickel-chrome alloy (21) or a constantan via the first mask (67) onto the support (25) by sputtering and generating a double row (71, 72) of two L-shaped fields (73, 73') on the front side (26) of the support (25), subsequently, placing a second mask (68) provided with a cutout onto the front side (26) of the support (25) and generating by sputtering of material a terminal tab (78) on the support (25), subsequently, placing a third mask (69) onto the front side (26) of the support (25), wherein the third mask (69) has two rows (71, 72) of two I-shaped cutouts (80, 80'), sputtering constantan (22) or a nickel-chrome alloy via the third mask (69) onto the front side (26) of the support (25) to generate two I-shaped fields (83, 83'), wherein the two I-shaped fields with respect to length as well as with respect to width and position are exactly aligned with the L-shaped fields (73, 73') and overlap with end areas (81, 82 or 81',82') short L-legs (75, 75') of a same row (71, 72) of the L-shaped fields and the legs ends (79, 79') of long L-legs of the L-shaped fields (73, 73') in a neighboring row (72, 71) and form a double row (71, 72) of two measuring sensor pairs (43), and, finally, placing first a fourth mask (85) and then a fifth mask (85, 86) onto the backside (27) of the support (25), wherein the fourth mask (85) has a narrow slot (88) and the fifth mask (86) has a wide slot (87), sputtering metallic material onto the backside via the fourth and fifth masks to form a common heating conductor (28) and a return line on the backside (27) of the support (25);

wherein the heating conductor (27) is arranged in a longitudinal center of overlaps (82, 79' or 82', 79) of the double rows (71, 72) positioned on the front side and forms a common hot junction point (23) of the measuring sensor pairs (43), wherein overlaps (81, 75 or 81', 75') positioned in the two border areas of the double row (71, 72) form two cold junction points (24, 24') of the two measuring sensor pairs (43), wherein the device has at least one reference sensor (33) for correction of a change of a heating current in the heating conductor (28) caused by a change of a surrounding temperature or an operating voltage.

2. Device for electronically measuring the filling level (16) of a liquid (15) in a container (11) or for gas quantity measurement, the device comprising:

a set of thermoelements (20) arranged on a single sheet-shaped support (25) and connected in series and functioning as measuring sensors (43);

wherein on a front side (26) of the sheet-shaped support (25) a double row (71, 72) of two L-shaped fields (73, 73'), having long L-legs with leg ends and short L-legs, is applied by sputtering a nickel-chrome alloy (21) or constantan via a first mask (67) onto the sheet-shaped support (25), a terminal tab (78) provided on the front side of the sheet-shaped support (25) by sputtering material via a second mask (68) onto the front side (26) of the support (25);

two I-shaped fields generated by sputtering constantan (22) or a nickel-chrome alloy via a third mask (69) onto the front side (26) of the support (25), wherein the two I-shaped fields with respect to length as well as with respect to width and position are exactly aligned with the L-shaped fields (73, 73') and overlap with end areas (81, 82 or 81',82') the short L-legs (75, 75') of a same row (71, 72) of the L-shaped fields and the legs ends (79, 79') of the long-L-legs of the L-shaped fields (73, 73') in a neighboring row (72, 71) and form a double row (71, 72) of two measuring sensor pairs (43);

a common heating conductor (28) and a return line provided on the backside (27) of the support (25) by sputtering metallic material onto the backside via a fourth mask and a fifth mask;

wherein the heating conductor (27) is arranged in a longitudinal center of overlaps (82, 79' or 82', 79) of the double rows (71, 72) positioned on the front side and forms a common hot junction point (23) of the measuring sensor pairs (43);

wherein overlaps (81, 75 or 81', 75') positioned in the two border areas of the double row (71, 72) form two cold junction points (24, 24') of the two measuring sensor pairs (43);

wherein the device has at least one reference sensor (33) for correction of a change of a heating current in the heating conductor (28) caused by a change of a surrounding temperature or an operating voltage;

wherein the double row (71, 72) of the measuring sensors (43) has correlated therewith a set of reference sensors (33) arranged in a container interior (19); and wherein—as a function of a filling level (16)—a partial set (63) of the reference sensors (33) is positioned at a height area of liquid (15) while a remaining set (64) is positioned in a gas (17) above the liquid;

wherein, however, the junction points (23, 24) of the partial set (63) of the reference sensors as well as of the remaining set (64) of the reference sensors (33)—independent of the filling level (16) in the container (11)—are always in thermal contact with a body (55, 56, 57) having always a constant thermal conductivity.

3. Device according to claim 2, wherein the reference sensors (33), toward the container interior (19), are covered by a thermal insulation (55, 56, 57) which, independent of the filling level (16) in the container (11), provides for a constant thermal conductivity.

4. Device according to claim 2, wherein the support (25) comprising the measuring sensors (43) and the heating conductor (28) is surrounded by an envelope (50) which prevents the direct contact with the liquid (15) or the gas (17) and optionally surrounds also the carrier (25) with the reference sensors (33), and wherein the thermal insulation (56) in an envelope interior (51) of the envelope and/or on the outer side of the envelope (50) is arranged in the area of the reference sensors (33).

5. Device according to claim 3, wherein the thermal insulation is comprised of a continuous air bag (55) which extends over several or all reference sensors (33).

6. Device according to claim 3, wherein the thermal insulation is comprised of air chambers (57) on the individual reference sensors (33).

7. Device according to claim 3, wherein the thermal insulation is comprised of a foam layer (56).

8. Device according to claim 2, wherein the measuring sensors (43) and reference sensors (33) are arranged on a common support (25).

9. Device according to claim 2, wherein the number of measuring sensors (43) is substantially identical to the number of reference sensors (33).

10. Device according to claim 2, wherein the measuring sensors (43), on the one hand, and the reference sensors (33), on the other hand, are positioned in an arrangement pattern substantially identical relative to one another on their supports or on a common support (25).

11. Device according to claim 2, wherein the entire set of measuring sensors (43) and the entire set of reference sensors (33) are comprised of the same thermoelements (20).

12. Device according to claim 2, wherein the measuring sensors (43), on the one hand, and the reference sensors (33), on the other hand, are arranged in symmetrical configuration on a common support (25), and that on the same carrier (25) on the oppositely positioned support side (27) a common electrical heating conductor (28) is provided which heats the hot junction points (23) of the measuring sensors (43) as well as of the reference sensors (33).

13. Device according to claim 2, wherein electrical lines (18) for the measuring voltage and/or for the reference voltage provided between a measuring device (12) comprising the thermoelements (20) and an evaluation device (13) are twisted with one another.

* * * * *

UNITED STATES PATENT AND TRADEMARK OFFICE
CERTIFICATE OF CORRECTION

PATENT NO.     : 6,662,429 B1  
DATED          : December 16, 2003  
INVENTOR(S)    : Gottfried Domorazek Page 1 of 1

It is certified that error appears in the above-identified patent and that said Letters Patent is hereby corrected as shown below:

<u>Title page,</u>
Item [22], should read as -- [22] PCT Filed:   Dec. 24, 1998 --.

Signed and Sealed this

Twenty-second Day of June, 2004

JON W. DUDAS
*Acting Director of the United States Patent and Trademark Office*